US012269393B2

(12) United States Patent
Maeda et al.

(10) Patent No.: US 12,269,393 B2
(45) Date of Patent: Apr. 8, 2025

(54) VEHICLE DISPLAY DEVICE AND VEHICLE INCLUDING VEHICLE DISPLAY DEVICE

(71) Applicant: TOYOTA JIDOSHA KABUSHIKI KAISHA, Aichi-ken (JP)

(72) Inventors: Kazuhisa Maeda, Toyota (JP); Tatsuya Shimizu, Okazaki (JP); Takanobu Tabata, Toyota (JP); Yasuyuki Andou, Toyota (JP); Takahiro Suzuki, Toyota (JP); Fumihiro Onogi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 53 days.

(21) Appl. No.: 18/163,879

(22) Filed: Feb. 3, 2023

(65) Prior Publication Data

US 2023/0249621 A1 Aug. 10, 2023

(30) Foreign Application Priority Data

Feb. 4, 2022 (JP) ................................. 2022-016685

(51) Int. Cl.
*B60R 1/29* (2022.01)
*B60R 11/00* (2006.01)
(Continued)

(52) U.S. Cl.
CPC ................ *B60R 1/29* (2022.01); *G06F 3/147* (2013.01); *B60R 2011/0003* (2013.01);
(Continued)

(58) Field of Classification Search
CPC .. B60R 1/00; B60R 1/29; B60R 11/02; B60R 11/0235; B60R 2011/0003;
(Continued)

(56) References Cited

U.S. PATENT DOCUMENTS 5,940,120 A 8/1999 Frankhouse et al.
9,855,918 B1 1/2018 Melaragni et al.
(Continued)

FOREIGN PATENT DOCUMENTS

CN 112428933 A 3/2021
DE 4128663 C2 10/2002
(Continued)

OTHER PUBLICATIONS

Office Action in U.S. Appl. No. 17/709,410, mailed Feb. 1, 2024, 34p.
(Continued)

*Primary Examiner* — Christopher S Kelley
*Assistant Examiner* — Ana Picon-Feliciano
(74) *Attorney, Agent, or Firm* — HAUPTMAN HAM, LLP

(57) ABSTRACT

A vehicle display device includes a first display unit disposed in front of and above a driver's seat and including a display screen configured to be deployed from an interior member into the vehicle cabin and be withdrawn from the vehicle cabin into an inside of the interior member, a drive unit configured to drive the display screen, and a control unit configured to control the first display unit and the drive unit. The control unit includes a driving status acquisition unit configured to acquire a driving status of a vehicle, a drive control unit configured to change a deployment amount of the display screen based on the acquired driving status, and a display control unit configured to cause the display screen to display a rear seat image captured by an in-vehicle camera for a rear seat to fit with the deployment amount of the display screen.

20 Claims, 10 Drawing Sheets

(51) Int. Cl.
*B60R 11/02* (2006.01)
*G06F 3/147* (2006.01)

(52) U.S. Cl.
CPC .......... *B60R 2011/0082* (2013.01); *B60R 2011/0092* (2013.01); *B60R 11/0235* (2013.01); *B60R 2300/70* (2013.01); *B60R 2300/8013* (2013.01)

(58) Field of Classification Search
CPC ..... B60R 2011/0082; B60R 2011/0092; B60R 2300/70; B60R 2300/8013; G06F 3/1423; G06F 3/147; G06V 20/593; G09G 2354/00; G09G 2380/10; B60K 2360/176; B60K 2360/178; B60K 2360/182; B60K 2360/1868; B60K 2360/1876; B60K 2360/331; B60K 2360/349; B60K 2360/771; B60K 35/00; B60K 35/22; B60K 35/223; B60K 35/23; B60K 35/28; B60K 35/29; B60K 35/53; B60K 35/60; B60K 35/81
USPC ............................................. 348/148; 701/36
See application file for complete search history.

(56) References Cited

U.S. PATENT DOCUMENTS

| | | |
|---|---|---|
| 2006/0279959 A1 | 12/2006 | Yabashi et al. |
| 2014/0129092 A1 | 5/2014 | Mori et al. |
| 2017/0217290 A1 | 8/2017 | Yoshizumi et al. |
| 2017/0313192 A1 | 11/2017 | Segawa et al. |
| 2017/0313248 A1* | 11/2017 | Kothari .............. B60R 1/28 |
| 2018/0286358 A1 | 10/2018 | Wunderlich |
| 2019/0041652 A1 | 2/2019 | Murayama et al. |
| 2019/0061782 A1* | 2/2019 | Cheaz .............. G08G 1/096775 |
| 2019/0202349 A1* | 7/2019 | Winton .................... B60Q 3/51 |
| 2019/0210529 A1 | 7/2019 | Izumi et al. |
| 2020/0055378 A1* | 2/2020 | Yoshizumi ............. B60J 3/0204 |
| 2021/0016663 A1 | 1/2021 | Ha et al. |
| 2021/0129635 A1 | 5/2021 | Park et al. |
| 2021/0206266 A1 | 7/2021 | Shim et al. |
| 2021/0212223 A1 | 7/2021 | Song et al. |
| 2021/0213830 A1 | 7/2021 | Son et al. |
| 2021/0213831 A1 | 7/2021 | Kang et al. |
| 2021/0216183 A1 | 7/2021 | Kang et al. |
| 2022/0058996 A1 | 2/2022 | Yoshizumi et al. |
| 2022/0281287 A1 | 9/2022 | Shariatzadeh et al. |
| 2022/0314799 A1 | 10/2022 | Maeda et al. |
| 2023/0131157 A1 | 4/2023 | Onogi et al. |
| 2023/0228588 A1 | 7/2023 | Lee et al. |
| 2023/0249551 A1 | 8/2023 | Maeda et al. |
| 2023/0391193 A1 | 12/2023 | Huang et al. |
| 2024/0135729 A1* | 4/2024 | Kumagai .............. B60R 16/0231 |

FOREIGN PATENT DOCUMENTS

| | | |
|---|---|---|
| JP | 200325911 A | 1/2003 |
| JP | 2006-044567 A | 2/2006 |
| JP | 2016-155540 A | 9/2016 |
| JP | 2018-034715 A | 3/2018 |
| JP | 2019-031138 A | 2/2019 |
| JP | 2020-117172 A | 8/2020 |
| JP | 2020-189618 A | 11/2020 |
| JP | 2020-194179 A | 12/2020 |
| JP | 2022158818 A | 10/2022 |

OTHER PUBLICATIONS

U.S. Appl. No. 17/709,410, filed Mar. 31, 2022, 46pp.
U.S. Appl. No. 18/069,891, filed Dec. 21, 2022, 96pp.
U.S. Appl. No. 18/089,564, filed Dec. 28, 2022, 33pp.

* cited by examiner

VEHICLE DISPLAY DEVICE AND VEHICLE INCLUDING VEHICLE DISPLAY DEVICE

CROSS-REFERENCE TO RELATED APPLICATION

This application claims priority to Japanese Patent Application No. 2022-016685 filed on Feb. 4, 2022, incorporated herein by reference in its entirety.

BACKGROUND

1. Technical Field

The present disclosure relates to a vehicle display device and a vehicle including a vehicle display device.

2. Description of Related Art

Japanese Unexamined Patent Application Publication No. 2003-025911 (JP 2003-025911 A) discloses an in-vehicle display device that enables a front seat occupant to check the condition of a child who is a rear seat occupant while driving a vehicle. In this in-vehicle display device, a rear seat camera captures an image of the rear seat occupant, and a front seat display mounted on an instrument panel or the like displays the captured image, thereby enabling the front seat occupant to check the condition of the rear seat occupant.

SUMMARY

When a driver in the front seat checks the state of the rear seat while the vehicle is traveling, it is desirable to check the state in a way that is less burdensome for the driver so as not to hinder the driving.

When the front seat display is mounted on the instrument panel as in the technology described in JP 2003-025911 A, however, the driver needs to look down from the forward side of the vehicle to view the display. Therefore, the amount of line-of-sight movement increases. From the viewpoint of reducing such a burden on the driver, the display may be provided, for example, in front of and above the driver's seat.

The area in front of and above the driver's seat is also an area included in the field of view of the driving occupant. The occupant may feel annoyed depending on the size of a display unit.

The present disclosure provides a vehicle display device that can reduce a burden on an occupant driving in a front seat when checking the state of a rear seat.

A vehicle display device according to a first aspect of the present disclosure includes a first display unit disposed in front of and above a driver's seat and including a display screen configured to be deployed from an interior member in a vehicle cabin into the vehicle cabin and be withdrawn from the vehicle cabin into an inside of the interior member, a drive unit configured to drive the display screen of the first display unit, and a control unit configured to control the first display unit and the drive unit. The control unit includes a driving status acquisition unit configured to acquire a driving status of a vehicle, a drive control unit configured to change a deployment amount of the display screen into the vehicle cabin under control of the drive unit based on the acquired driving status, and a display control unit configured to cause the display screen to display a rear seat image captured by an in-vehicle camera for a rear seat to fit with the deployment amount of the display screen.

The vehicle display device according to the first aspect of the present disclosure includes the first display unit disposed in front of and above the driver's seat and including the display screen configured to be deployed from the interior member in the vehicle cabin into the vehicle cabin and be withdrawn from the vehicle cabin into an inside of the interior member. The deployment amount of the first display unit into the vehicle cabin can be changed because the drive unit drives the display screen. The vehicle display device includes the control unit configured to control the first display unit and the drive unit. The control unit includes the driving status acquisition unit, the drive control unit, and the display control unit. The drive control unit changes the deployment amount of the display screen into the vehicle cabin under control of the drive unit based on the driving status acquired by the driving status acquisition unit. The display control unit causes the display screen to display the rear seat image captured by the in-vehicle camera for the rear seat to fit with the deployment amount of the display screen. Thus, an occupant in the driver's seat can check the state of the rear seat by slightly moving the line of sight to view the first display unit. For example, during traveling, the deployment amount of the display screen can be adjusted so as not to obstruct the field of view of the driver, thereby reducing the occurrence of a case where the occupant feels annoyed while driving the vehicle. Accordingly, the vehicle display device can reduce a burden on the occupant driving in the driver's seat when checking the state of the rear seat.

In the vehicle display device according to the first aspect of the present disclosure, the control unit may include a position information acquisition unit configured to acquire position information of the vehicle. The drive control unit may be configured to change, based on the acquired position information of the vehicle, the deployment amount of the display screen within a predetermined range set in a country or a region where the vehicle is located.

In the vehicle display device according to the first aspect of the present disclosure, the drive control unit may be configured to change the deployment amount of the display screen within the predetermined range set in the country or the region where the vehicle is located based on the position information of the vehicle acquired by the position information acquisition unit. Therefore, the vehicle display device can set the deployment position of the first display unit in compliance with laws and regulations of the country or the region where the vehicle is located.

In the vehicle display device according to the first aspect of the present disclosure, the drive control unit may be configured to set a deployment amount of the display screen into the vehicle cabin when the acquired driving status is a traveling state to be smaller than a deployment amount of the display screen into the vehicle cabin when the acquired driving status is a temporarily stopped state or a deployment amount of the display screen into the vehicle cabin when the acquired driving status is a stopped state.

In the vehicle display device according to the first aspect of the present disclosure, the drive control unit may be configured to set the deployment amount of the display screen into the vehicle cabin when the acquired driving status is the temporarily stopped state to be smaller than the deployment amount of the display screen into the vehicle cabin when the acquired driving status is the stopped state.

In the vehicle display device according to the first aspect of the present disclosure, the control unit may include a biometric information acquisition unit configured to acquire biometric information of an occupant in the rear seat. The display control unit may be configured to cause the display screen to display the rear seat image when predetermined biometric information is acquired.

In the vehicle display device according to the first aspect of the present disclosure, the display control unit may cause the display screen to display the rear seat image when the biometric information acquisition unit has acquired the predetermined biometric information about the occupant in the rear seat. Therefore, it is possible to prompt the occupant in the driver's seat to check the first display unit at an appropriate timing in response to a change in the occupant in the rear seat.

In the vehicle display device according to the first aspect of the present disclosure, the drive control unit may be configured to, before the deployment amount of the display screen into the vehicle cabin is changed based on the acquired driving status and when the predetermined biometric information is acquired, deploy the display screen by the deployment amount that is based on the driving status of the vehicle from a retracted state in which the first display unit is retracted in the inside of the interior member. The display control unit may be configured to cause the display screen to display the rear seat image after the display screen is deployed.

In the vehicle display device according to the first aspect of the present disclosure, the display control unit can prompt the occupant in the driver's seat to actively check the first display unit in response to the change in the occupant in the rear seat even when the first display unit is retracted in the inside of the interior member.

In the vehicle display device according to the first aspect of the present disclosure, the predetermined biometric information may be biometric information having a value exceeding a predetermined threshold set based on a type of the biometric information.

In the vehicle display device according to the first aspect of the present disclosure, (i) the biometric information may be voice of the occupant in the rear seat, and the predetermined biometric information may be voice of the occupant in the rear seat with a volume exceeding the predetermined threshold. Alternatively, (ii) the biometric information may be motion of the occupant in the rear seat, and the predetermined biometric information may be motion of the occupant in the rear seat with a motion amount exceeding the predetermined threshold.

In the vehicle display device according to the first aspect of the present disclosure, the display control unit may be configured to display the rear seat image in an area of the display screen, the area of the display screen being associated with a position of an occupant in the rear seat in the vehicle cabin.

In the vehicle display device according to the first aspect of the present disclosure, the display control unit may display the rear seat image in the area of the display screen, the area of the display screen being associated with the position of the occupant in the rear seat in the vehicle cabin. By viewing the first display unit, the occupant can check the state of the rear seat by intuitively grasping the positional relationship between the occupants in the space inside the vehicle cabin from the display screen.

In the vehicle display device according to the first aspect of the present disclosure, the display control unit may be configured to display support information that supports an occupant in the driver's seat side by side with the rear seat image while keeping the area of the display screen where the rear seat image is displayed.

In the vehicle display device according to the first aspect of the present disclosure, the display control unit may display the support information that supports the occupant in the driver's seat side by side with the rear seat image while keeping the area of the display screen where the rear seat image is displayed. As a result, when both the rear seat image and the support information are displayed, blinking of the display screen can be reduced, thereby reducing the annoyance felt by the occupant.

The support information is not herein limited to support information during the traveling, but is a broad concept that includes support information that can be displayed while the vehicle is stopped.

The vehicle display device according to the first aspect of the present disclosure may further include a second display unit disposed in front of the rear seat. The display control unit may be configured to, when causing the first display unit to display the rear seat image, cause the second display unit to display a driver's seat image captured by an in-vehicle camera for the driver's seat.

In the vehicle display device according to the first aspect of the present disclosure, when causing the first display unit to display the rear seat image, the display control unit may cause the second display unit disposed in front of the rear seat to display the driver's seat image captured by the in-vehicle camera for the driver's seat. As a result, the occupant in the driver's seat and the occupant in the rear seat can check the states of each other, thereby facilitating communication.

The vehicle display device according to the first aspect of the present disclosure may further include an occupant position detection unit configured to detect a position of an occupant in the rear seat in the vehicle cabin. The display control unit may be configured to identify an in-vehicle camera that has captured an image of the occupant in the rear seat from among a plurality of in-vehicle cameras for the rear seat based on the detected position of the occupant, and cause the display screen to display the image captured by the identified in-vehicle camera.

In the vehicle display device according to the first aspect of the present disclosure, the first display unit can reliably display the image of the occupant in the rear seat even when the plurality of in-vehicle cameras for the rear seats is installed because of, for example, the plurality of rear seats.

The vehicle display device according to the first aspect of the present disclosure may further include an occupant position detection unit configured to detect a position of an occupant in the rear seat in the vehicle cabin. The display control unit may be configured to control drive of an actuator connected to the in-vehicle camera for the rear seat, change an image capturing range of the in-vehicle camera by controlling the drive of the actuator to include the detected position of the occupant, and cause the display screen to display the rear seat image captured by the in-vehicle camera for the rear seat.

In the vehicle display device according to the first aspect of the present disclosure, for example, even when a plurality of rear seats is provided, the image capturing range of the in-vehicle camera may be changed by controlling the drive of the actuator to include the position of the occupant in the rear seat. Therefore, the image of the occupant can be displayed on the first display unit without increasing the number of in-vehicle cameras to be installed.

The vehicle display device according to the first aspect of the present disclosure may further include an occupant position detection unit configured to detect a position of an occupant in the rear seat in the vehicle cabin. The display control unit may be configured to extract an image showing an area that is based on the detected position of the occupant from the rear seat image captured by the in-vehicle camera for the rear seat, and cause the display screen to display the extracted image.

In the vehicle display device according to the first aspect of the present disclosure, for example, even when a plurality of rear seats is provided, the image showing the area that is based on the detected position of the occupant may be extracted from the image captured by the in-vehicle camera for the rear seat and displayed on the display screen. By capturing the image showing the rear seats with the single in-vehicle camera, the image of the occupant can be displayed on the first display unit without increasing the number of in-vehicle cameras to be installed.

In the vehicle display device according to the first aspect of the present disclosure, the first display unit may include an organic electroluminescence element and may have a film shape.

In the vehicle display device according to the first aspect of the present disclosure, the first display unit may include the organic electroluminescence element and may have the film shape. Therefore, when retracting the first display unit, the first display unit can be bent.

A vehicle according to a second aspect of the present disclosure includes a vehicle cabin including a driver's seat and a rear seat, a vehicle display device including a first display unit disposed in front of and above the driver's seat and including a display screen configured to be deployed from an interior member in the vehicle cabin into the vehicle cabin and be withdrawn from the vehicle cabin into an inside of the interior member, a drive unit configured to drive the display screen of the first display unit, and a control unit configured to control the first display unit and the drive unit, and an in-vehicle camera for the rear seat. The control unit of the vehicle display device includes a driving status acquisition unit configured to acquire a driving status of the vehicle, a drive control unit configured to change a deployment amount of the display screen into the vehicle cabin under control of the drive unit based on the acquired driving status, and a display control unit configured to cause the display screen to display a rear seat image captured by the in-vehicle camera for the rear seat to fit with the deployment amount of the display screen.

The vehicle according to the second aspect of the present disclosure may further include an in-vehicle camera for the driver's seat. The vehicle display device may include a second display unit disposed in front of the rear seat. The display control unit may be configured to, when causing the first display unit to display the rear seat image, cause the second display unit to display a driver's seat image captured by the in-vehicle camera for the driver's seat.

According to the vehicle display device and the vehicle including the vehicle display device of the present disclosure, it is possible to reduce the burden on the occupant driving in the front seat when checking the state of the rear seat.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
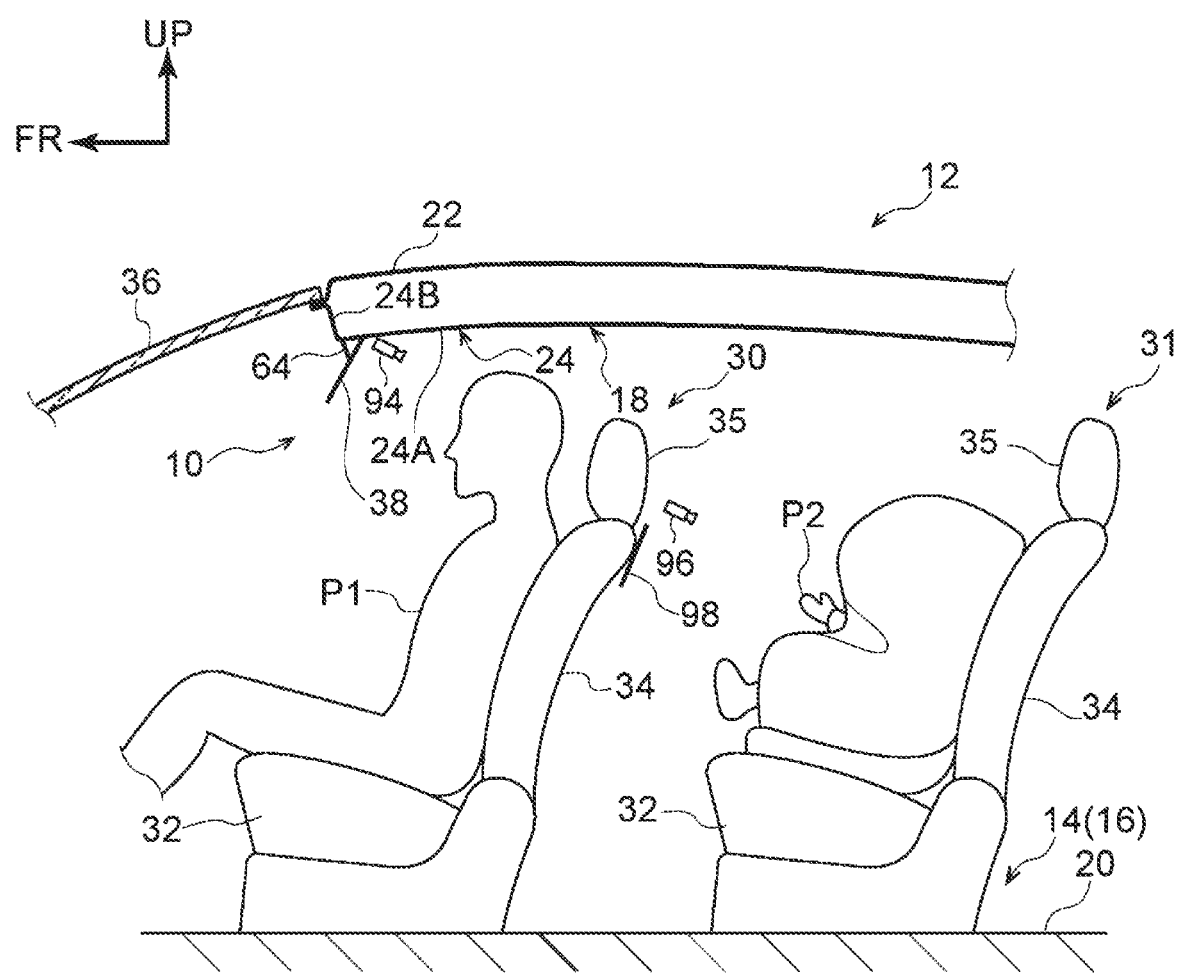
FIG. 1 is a side view schematically showing the configuration of a vehicle including a vehicle display device according to an embodiment.

A vehicle display device 10 according to the present embodiment will be described below with reference to FIGS. 1 to 12. An arrow FR indicates a forward side of a vehicle, and an arrow UP indicates an upper side of the vehicle, which appear as appropriate in the drawings. When terms that indicate directions such as "front", "rear", "up", "down", "right", and "left" are used in the following description, such terms should be understood to indicate forward and rearward directions in a vehicle front-rear direction, upward and downward directions in a vehicle up-down direction, and rightward and leftward directions as seen in a traveling direction of the vehicle, respectively, unless otherwise noted.

Vehicle 12

First, a vehicle 12 including the vehicle display device 10 will be described. For example, the vehicle 12 of the present embodiment is configured to switch autonomous driving and manual driving. The autonomous driving refers to a driving mode of a vehicle in which a part or all of operations on an accelerator, a brake, turn signals, a steering wheel, and the like are performed autonomously. The manual driving refers to a driving mode of a vehicle in which a driver performs all driving operations (operations on an accelerator, a brake, turn signals, a steering wheel, and the like).

As shown in FIG. 1, the vehicle 12 includes a vehicle body 16 constituting a main part of a "vehicle cabin 14". A part of the vehicle body 16 on the upper side of the vehicle is a roof 18. A part of the vehicle body 16 on the lower side of the vehicle is a floor 20.

Figure 2:
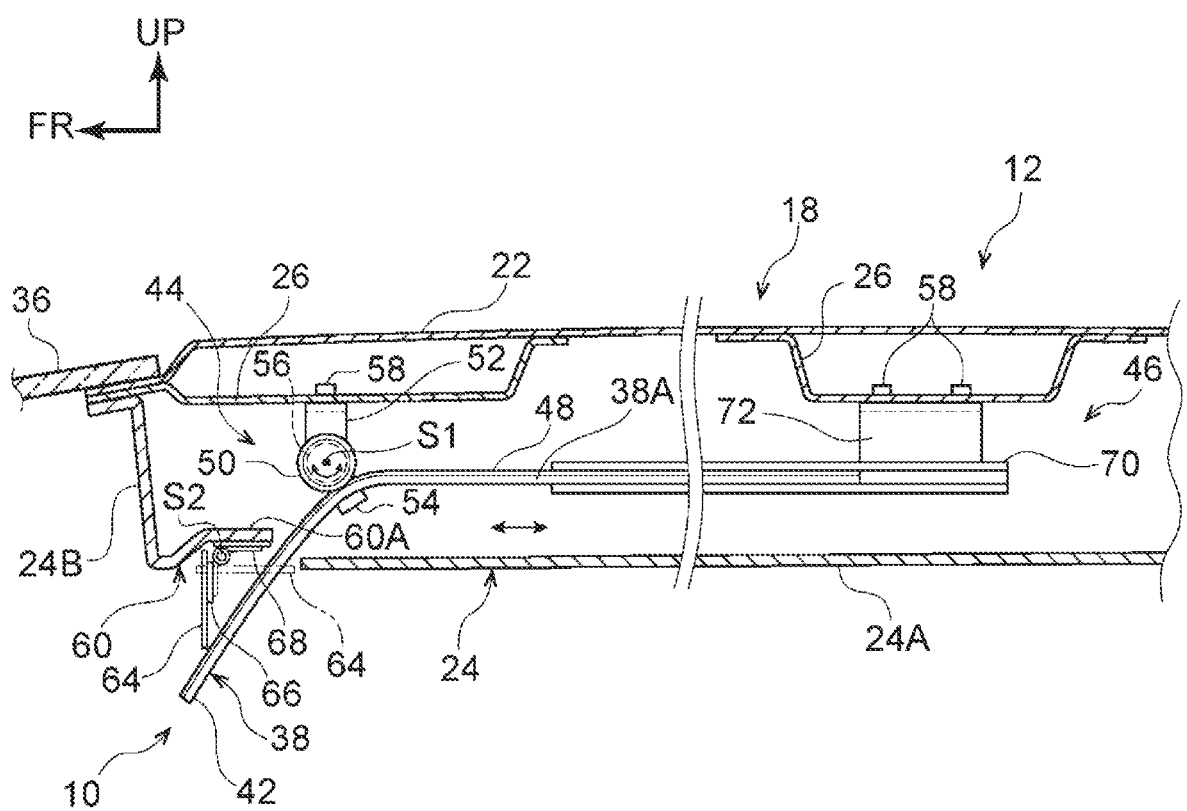
FIG. 2 is a sectional view in a vehicle width direction, for schematically showing the configuration of the vehicle display device according to the embodiment.

The roof 18 includes a roof panel 22 extending in the vehicle front-rear direction and a vehicle width direction and constituting a part of the design surface of the vehicle 12. The roof panel 22 is covered with a "roof trim 24" serving as an interior member from the lower side of the vehicle. As shown in FIG. 2, the roof trim 24 includes a ceiling surface portion 24A constituting the ceiling surface of the vehicle cabin 14 and extending in the vehicle front-rear direction and the vehicle width direction, and a front wall portion 24B extending from a peripheral edge of the ceiling surface portion 24A on the front side of the vehicle to the upper side of the vehicle.

As shown in FIG. 2, the roof panel 22 is reinforced with a plurality of roof reinforcements 26 arranged apart from each other in the vehicle front-rear direction. The roof reinforcement 26 extends in the vehicle width direction, and constitutes, together with the roof panel 22, a closed-section structure having a closed section when viewed in the vehicle width direction. The roof reinforcement 26 located closest to the front of the vehicle is disposed along a peripheral edge of the roof panel 22 on the front side of the vehicle. The roof trim 24 is attached to the roof reinforcement 26 by an attachment member such as a fastener (not shown).

Referring back to FIG. 1, a driver's seat 30 on which an occupant P1 who is a driver sits and rear seats 31 on which rear-seat occupants P2 sit are arranged on the floor 20. Each of the driver's seat 30 and the rear seat 31 includes a seat cushion 32, a seat back 34, and a headrest 35. The lower end of the seat back 34 is rotatable relative to the rear end of the seat cushion 32. The rear-seat occupant P2 is, for example, a child sitting on a child seat.

In the vehicle cabin 14, a first camera 94 is installed as an in-vehicle camera for the driver's seat to capture an image of the occupant P1 who is the driver. The first camera 94 is, for example, fixed to the roof panel 22 and disposed in front of and above the driver's seat 30. In the vehicle cabin 14, a plurality of second cameras 96 is installed as in-vehicle cameras for the rear seats to capture images of the rear-seat occupants P2. It is not essential to install the plurality of second cameras 96, and any appropriate number of second cameras may be installed to capture images of all the occupants sitting on the rear seats 31 provided in the vehicle cabin 14.

A front windshield 36 is disposed in front of the driver's seat 30, that is, at a part of the vehicle body 16 on the front side of the vehicle. The front windshield 36 is a transparent glass plate, and extends downward on the front side of the vehicle from a peripheral edge of the roof 18 on the front side of the vehicle when viewed in the vehicle width direction.

A resin instrument panel (not shown) serving as an interior member is disposed on the lower side of the vehicle with respect to the front windshield 36. The instrument panel covers a heating, ventilation, and air conditioning (HVAC) unit (not shown) from the rear side of the vehicle.

Vehicle Display Device 10

Next, the vehicle display device 10 will be described. The vehicle display device includes a first display unit 38, a drive unit 44, a second display unit 98, and a control unit 40 (see FIG. 2). The first display unit 38, the drive unit 44, and the second display unit 98 are controlled by the control unit 40.

First Display Unit 38

The first display unit 38 is constituted by a display disposed between the roof panel 22 and the roof trim 24. The first display unit 38 is disposed in front of and above the driver's seat 30 and includes a display screen 42 that is configured to be deployed from the roof trim 24 serving as the interior member into the vehicle cabin 14 and be withdrawn from the vehicle cabin 14 into the inside of the roof trim 24. The first display unit 38 is provided at a position within the field of view of the driver with his/her line of sight oriented to the front side of the vehicle. The first display unit 38 will be described in detail below.

The first display unit 38 includes an organic electroluminescence element, has a rectangular film shape in plan view, and includes the "display screen 42" configured to display information for the occupant P1 as shown in FIG. 2 and the like. The first display unit 38 is electrically connected to the control unit 40 via wires (not shown), and can cause the display screen 42 to display various images in response to signals output from the control unit 40. The first display unit 38 is supported on the vehicle body 16 by the drive unit 44 and a display support 46. A deployment amount L of the display screen 42 into the vehicle cabin is changed by controlling the drive unit 44 in response to a signal output from the control unit 40.

Drive Unit 44

Specifically, the drive unit 44 includes a pair of racks 48, a pair of pinions 50, a pair of mounts 52, a pair of guides 54, a motor 56, and a motor driver (not shown). The racks 48 are made of a material having flexibility, arranged at ends 38A of the first display unit 38 on both sides in the vehicle width direction, and provided along the vehicle front-rear direction at parts of the ends 38A on the upper side of the vehicle. In other words, the racks 48 can be regarded as constituting a part of the ends 38A of the first display unit 38.

The pinions 50 are arranged at the ends 38A of the first display unit 38 and engaged with the racks 48. The pinion 50 on one side in the vehicle width direction is coupled to an output shaft (not shown) of the motor 56. When the motor 56 is operated based on a control signal from the control unit 40, the pinion 50 rotates about a rotation axis S1 extending in the vehicle width direction to move the first display unit 38 in the vehicle front-rear direction. The motor 56 is supported by the mount 52 on one side in the vehicle width direction. The mount 52 is fixed by a fastening member (not shown) to a weld nut 58 provided on the roof reinforcement 26 located closest to the front of the vehicle.

The guides 54 are attached to the mounts 52 and support the first display unit 38 from the lower side of the vehicle. The shaft of the pinion 50 on the other side in the vehicle width direction is attached to the mount 52 on the other side in the vehicle width direction via a bearing (not shown). When the first display unit 38 is sent to the front side of the vehicle by the rotation of the pinions 50, the first display unit 38 is guided by the guides 54 so that a part of the first display unit 38 on the front side of the vehicle with respect to the guides 54 extends downward to the front side of the vehicle.

A recess 60 that is recessed to the upper side of the vehicle is provided at the boundary between the ceiling surface portion 24A and the front wall portion 24B of the roof trim 24. A slit 62 through which the first display unit 38 is insertable is provided at a part of the recess 60 on the rear side of the vehicle. The first display unit 38 extends to the outside of the roof trim 24 through the slit 62.

A plate-shaped cover 64 capable of covering the recess 60 from the lower side of the vehicle is disposed on the lower side of the vehicle with respect to the recess 60. The cover 64 is attached via a hinge 66 to an upper wall portion 60A constituting a part of the recess 60 on the upper side of the vehicle. The cover 64 is normally held in a closed state by a torsion spring 68 attached to the hinge 66 with the thickness direction of the cover 64 being the vehicle up-down direction. When the cover 64 is pushed by the first display unit 38 extending through the slit 62, the cover 64 rotates about a rotation axis S2 of the hinge 66 extending in the vehicle width direction to come into an open state. When the first display unit 38 is retracted through the slit 62, the cover 64 is closed by a restoring force of the torsion spring 68.

The display support 46 can mainly support a part of the first display unit 38 on the rear side of the vehicle, and includes a pair of guide rails 70 and a pair of rail mounts 72.

The guide rails 70 are arranged at the ends 38A of the first display unit 38, extend in the vehicle front-rear direction, and have a U-shaped sectional shape that is open inward in the vehicle width direction when viewed in the vehicle front-rear direction. The ends 38A of the first display unit 38 including the racks 48 can be inserted into the guide rails 70. The guide rails 70 can guide the first display unit 38 in the vehicle front-rear direction. The guide rails 70 are attached via the rail mounts 72 to the roof reinforcement 26 located on the rear side of the vehicle with respect to the roof reinforcement 26 where the mounts 52 are fixed. The rail mounts 72 are fixed by fastening members (not shown) to weld nuts 58 provided on the roof reinforcement 26.

Second Display Unit

The second display unit 98 is constituted by a display disposed in front of the rear seat 31, and is attached to the back side of the seat back of the seat disposed in front of the rear seat 31 in the present embodiment. Similarly to the first display unit 38, the second display unit 98 may have a film shape including an organic electroluminescence element. Alternatively, the second display unit 98 may be a liquid crystal display. The second display unit 98 is electrically connected to the control unit 40 via wires (not shown), and can cause its display screen 42 to display various images in response to signals output from the control unit 40.

Hardware Configuration of Control Unit 40

Next, the configuration of the control unit 40 will be described. The control unit 40 serves as a control device that controls the first display unit 38, the drive unit 44, and the second display unit 98 of the vehicle display device 10.

Figure 5:
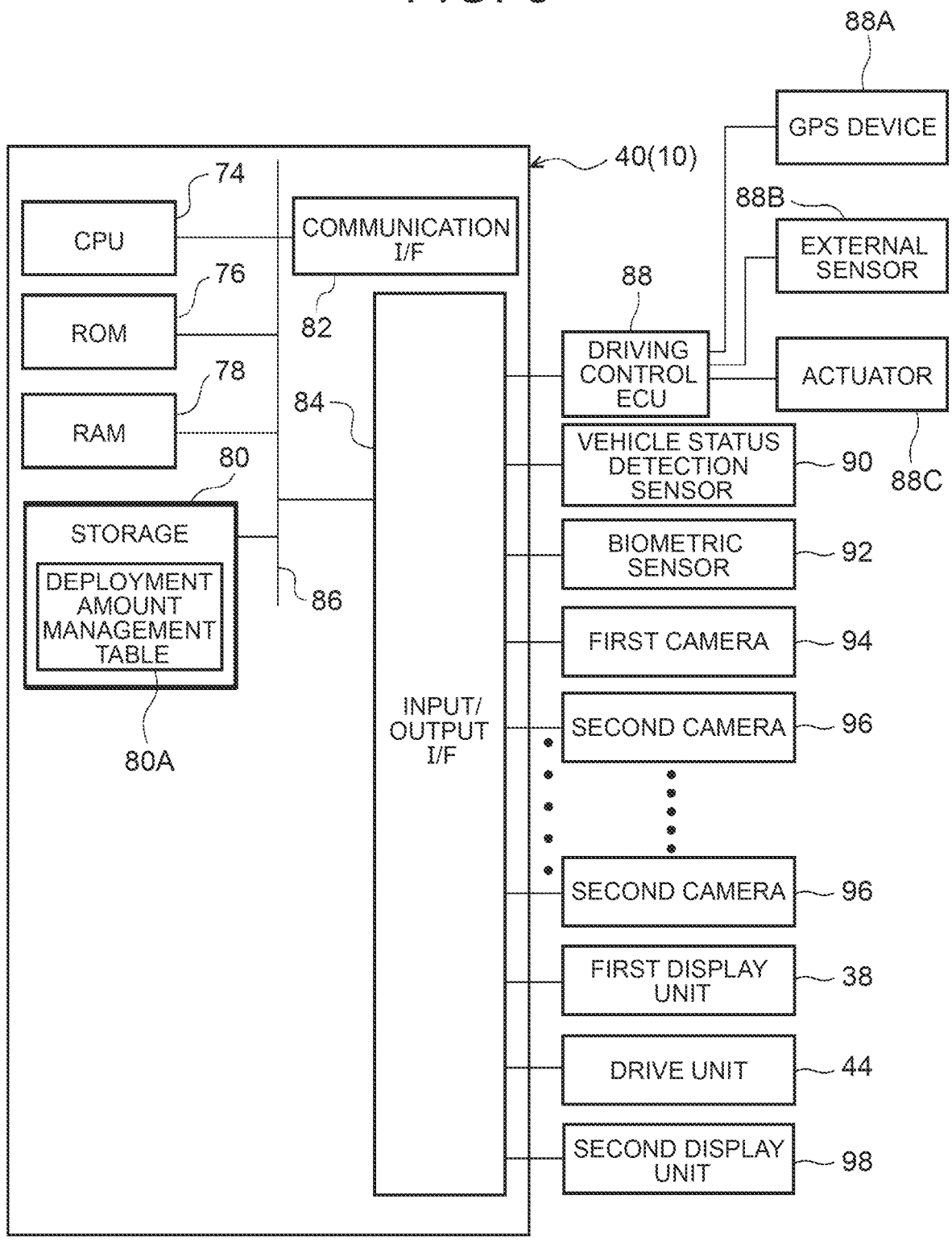
FIG. 5 is a block diagram showing a hardware configuration of the vehicle display device according to the embodiment.

FIG. 5 shows the hardware configuration of the control unit 40. The control unit 40 includes a central processing unit (CPU) 74, a read-only memory (ROM) 76, a random access memory (RAM) 78, a storage 80, a communication interface (I/F) 82, and an input/output I/F 84. The CPU 74, the ROM 76, the RAM 78, the storage 80, the communication I/F 82, and the input/output I/F 84 are communicably connected to each other via a bus 86. The CPU 74 is an example of a processor, and the RAM 78 is an example of a memory.

The CPU 74 is a central processing unit that executes various programs and controls various units. That is, the CPU 74 reads a program from the ROM 76 or the storage 80 and executes the program by using the RAM 78 as a work area. The CPU 74 controls the components described above and performs various arithmetic processes based on the programs stored in the ROM 76 or the storage 80.

The ROM 76 stores various programs and various types of data. The RAM 78 temporarily stores a program or data as a work area. The storage 80 is a hard disk drive (HDD) or a solid state drive (SSD) and stores various programs including an operating system and various types of data. In the present embodiment, the storage 80 stores a deployment amount management table 80A in which predetermined countries or regions are associated with values of corresponding deployment amounts L of the first display unit 38.

The communication I/F 82 is an interface for the control unit 40 to communicate with other devices. Standards such as a controller area network (CAN), Ethernet (registered trademark), long term evolution (LTE), fiber distributed data interface (FDDI), and Wi-Fi (registered trademark) are used.

The input/output I/F 84 is an interface for electrically connecting the control unit 40 to various devices mounted on the vehicle 12. In the present embodiment, for example, a driving control ECU 88, a vehicle status detection sensor 90, a biometric sensor 92, the first camera 94 for the driver's seat, the second cameras 96 for the rear seats, the first display unit 38, the drive unit 44, and the second display unit 98 are connected to the input/output I/F 84.

The driving control ECU 88 is an electronic control unit (ECU) that controls switching between the manual driving and the autonomous driving of the vehicle 12. When the driving mode of the vehicle 12 is switched to the autonomous driving, the driving control ECU 88 autonomously drives the vehicle 12 in accordance with a preset travel plan in consideration of position information and environmental information around the vehicle 12.

Specifically, the driving control ECU 88 is connected to a global positioning system (GPS) device 88A, an external sensor 88B, and an actuator 88C. The GPS device 88A acquires position information of the vehicle 12. The external sensor 88B includes at least one of, for example, a camera that captures an image of a predetermined range around the vehicle 12, a millimeter wave radar that transmits search waves to the predetermined range, and a light detection and ranging or laser imaging, detection, and ranging (Lidar) sensor that scans the predetermined range. The external sensor 88B acquires information about a traveling environment around the vehicle 12. The actuator 88C includes a steering actuator, an accelerator actuator, and a brake actuator. The steering actuator steers the vehicle 12. The accelerator actuator accelerates the vehicle 12. The brake actuator decelerates the vehicle 12 by controlling brakes. The driving control ECU 88 controls the actuator 88C based on the position information and the traveling environment information acquired by the GPS device 88A and the external sensor 88B to autonomously drive the vehicle 12 in accordance with the travel plan.

The vehicle status detection sensor 90 is used to detect an abnormality in the vehicle cabin 14. The vehicle status detection sensor 90 includes, for example, a door opening/closing sensor that detects an open/closed state of each door (not shown) of the vehicle 12, and a seat belt sensor that detects whether each seat belt (not shown) is fastened.

The biometric sensor 92 is used to acquire biometric information of an occupant. Examples of the biometric information include voice, facial expression, posture, body movement, body temperature, heartbeat, and weight of the occupant. The biometric sensor includes at least one of, for example, a microphone, an in-vehicle camera, a thermosensor, an electrocardiogram sensor, and an electroencephalogram sensor provided in the vehicle cabin 14, and a pressure sensor and an electrostatic sensor provided in each seat.

The first camera 94 for the driver's seat is provided to capture an image of the occupant P1 in the driver's seat. The second camera 96 for the rear seat is provided to capture an image of the occupant P2 in the rear seat. In the present embodiment, the number of second cameras 96 corresponds to the number of rear seats installed in the vehicle cabin 14.

Functional Configuration of Control Unit 40

The control unit 40 implements various functions by using the hardware resources described above. The functional configuration implemented by the vehicle display device 10 will be described with reference to FIG. 6.

Figure 6:
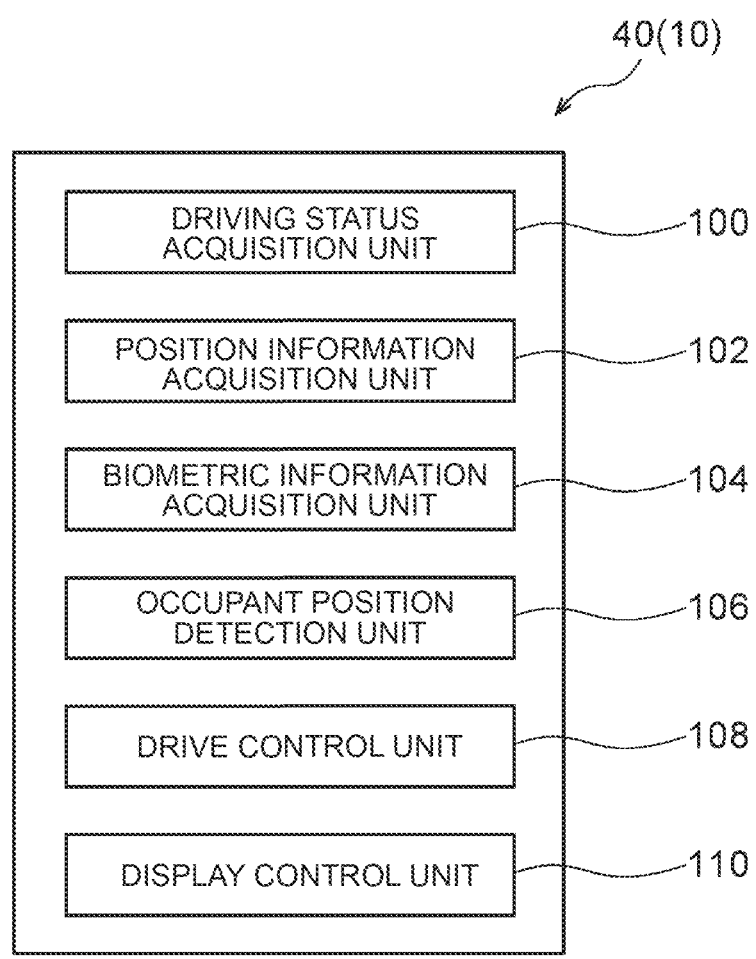
FIG. 6 is a block diagram showing a functional configuration of a control unit in the vehicle display device according to the embodiment.

As shown in FIG. 6, the control unit 40 includes, as functional components, a driving status acquisition unit 100, a position information acquisition unit 102, a biometric information acquisition unit 104, an occupant position detection unit 106, a drive control unit 108, and a display control unit 110. The functional components are implemented by the CPU 74 reading a program stored in the ROM 76 or the storage 80 and executing the program.

The driving status acquisition unit 100 acquires a driving status of the vehicle 12. Specifically, the driving status acquisition unit 100 acquires various driving statuses of the vehicle 12 based on information acquired from the driving control ECU 88. The driving statuses include the status of the driving mode including the autonomous driving and the manual driving, and a traveling state, a temporarily stopped state, or a stopped state of the vehicle 12.

The position information acquisition unit 102 acquires position information of the vehicle 12 by using the GPS device 88A.

The biometric information acquisition unit 104 acquires biometric information of the occupant P2 in the rear seat 31 by using the biometric sensor 92. The biometric information acquisition unit 104 may acquire biometric information of the occupant P1 in the driver's seat 30 by using the biometric sensor 92.

The occupant position detection unit 106 detects the position of the occupant P2 in the rear seat 31 in the vehicle cabin 14 by using the biometric sensor 92. For example, the occupant position detection unit 106 may detect the sitting position of the occupant P2 by analyzing an image captured by the second camera 96 that captures an image of the rear seat 31. The occupant position detection unit 106 may detect the sitting position of the occupant P2 based on a signal detected by the pressure sensor or the electrostatic sensor provided in the rear seat 31.

Figure 3:
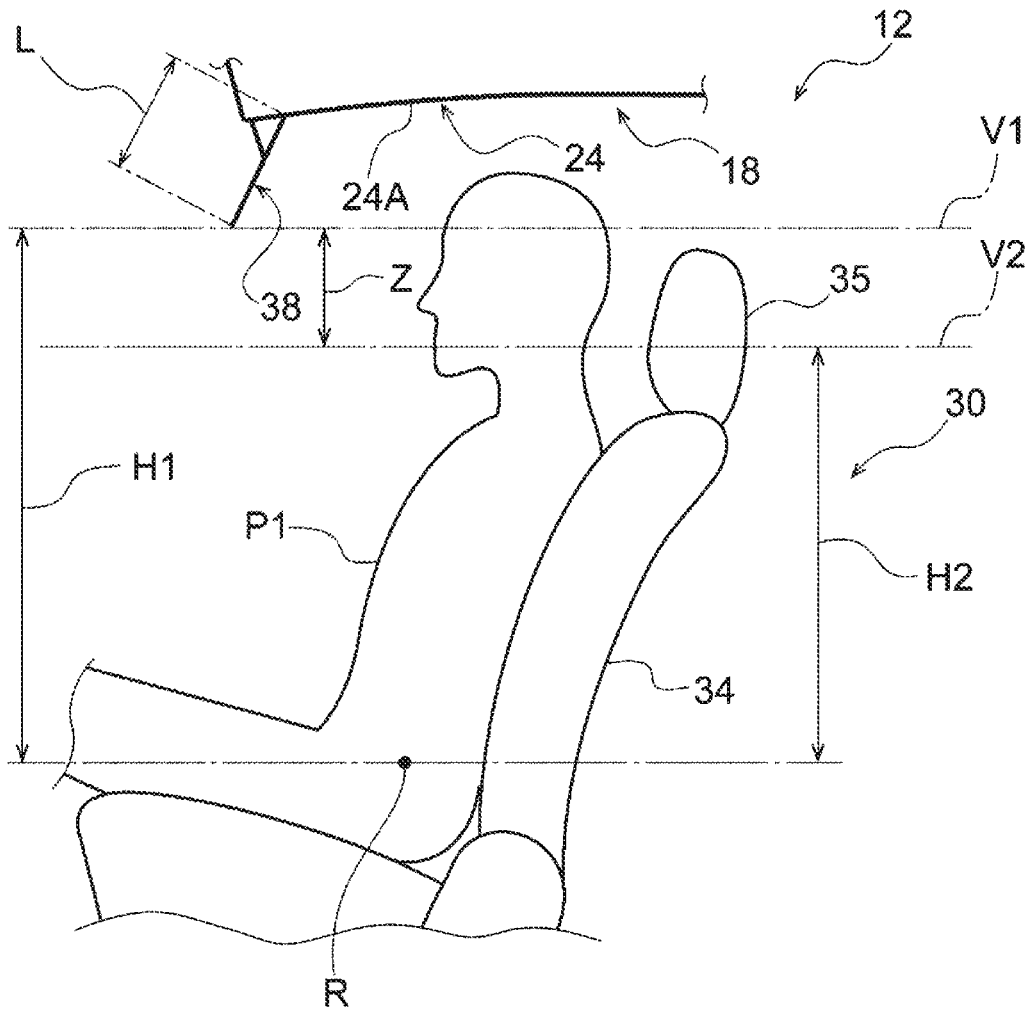
FIG. 3 is a side view schematically showing a relationship between the field of view of an occupant and the deployment amount of a first display unit in the vehicle display device according to the embodiment.

The drive control unit 108 determines the deployment amount L of the display screen 42 of the first display unit 38 into the vehicle cabin 14 based on the driving status of the vehicle 12, and controls the drive unit 44 to deploy the display screen 42. As shown in FIG. 3, the deployment amount L of the display screen 42 means an extension length of the first display unit 38 from the roof trim 24.

When the driving status of the vehicle 12 is the traveling state (traveling), the drive control unit 108 determines the deployment amount L so that the display screen 42 of the first display unit 38 is deployed within a range in which the display screen 42 does not enter a range Z including the driver's effective field of view. Then, the drive control unit 108 deploys the display screen 42 into the vehicle cabin 14.

As shown in FIG. 3, the range Z means an area in the vehicle up-down direction between a plane V1 extending in the vehicle front-rear direction and the vehicle width direction at a predetermined distance H1 from a sitting reference point R to the upper side of the vehicle and a plane V2 extending in the vehicle front-rear direction and the vehicle width direction at a predetermined distance H2 shorter than the distance H1 from the sitting reference point R to the upper side of the vehicle. The range Z is determined based on laws and regulations for each country or region where the vehicle 12 is located. In the deployment amount management table 80A stored in the storage 80, predetermined countries or regions are associated with values of corresponding deployment amounts L within ranges in which the display screen 42 does not enter the range Z.

That is, when the driving status of the vehicle 12 is the traveling state (traveling), the drive control unit 108 determines the deployment amount L of the display screen 42 by referring to the acquired position information of the vehicle 12 and the deployment amount management table 80A stored in the storage 80. As a result, the display screen 42 can be deployed within a range in which the display screen 42 does not obstruct the driver's field of view while the vehicle is traveling.

Figure 4:
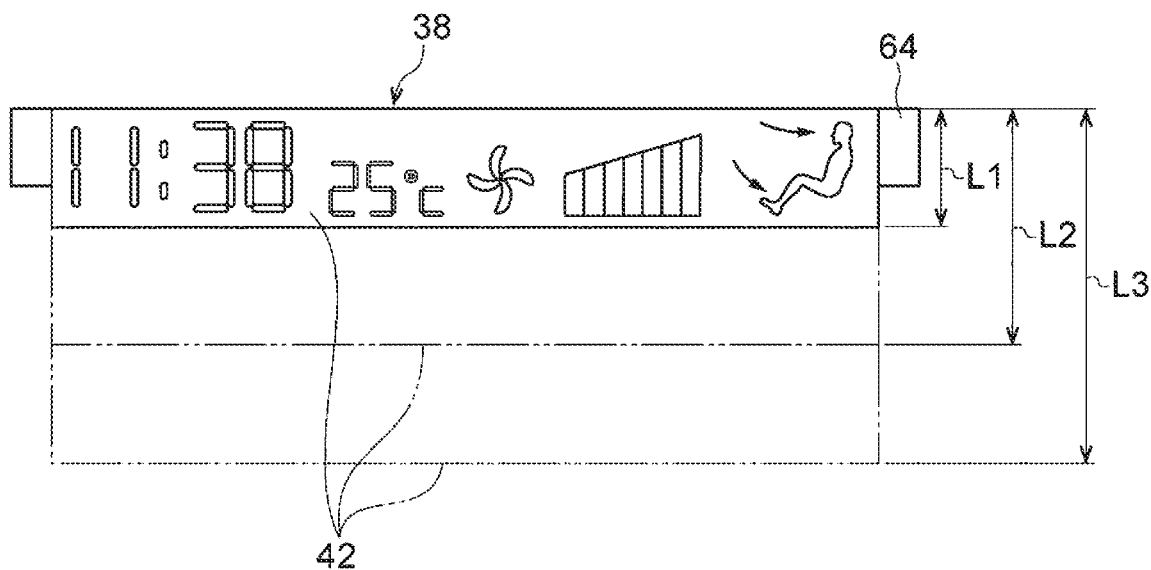
FIG. 4 is a schematic diagram showing an example of variations in the deployment amount of the first display unit depending on the driving status of the vehicle.

The deployment amount L of the display screen 42 may be set to different values for the traveling state, the temporarily stopped state, and the stopped state of the vehicle 12. For example, as shown in FIG. 4, when the driving status of the vehicle 12 is the traveling state, the deployment amount L is set to L1. In the temporarily stopped state, the deployment amount L is set to L2 larger than L1. In the stopped state, the deployment amount L is set to L3 larger than L2. As a result, the deployment amount L is increased so that the driver can easily view the display when the driver is not involved in the driving of the vehicle 12.

In this case, the temporarily stopped state of the vehicle 12 is, for example, a state in which the vehicle 12 is stopped for a predetermined period or longer while an ignition switch (not shown) of the vehicle 12 is ON. The stopped state of the vehicle 12 is a state in which the vehicle 12 is stopped while the ignition switch is OFF. Alternatively, the temporarily stopped state may be determined, for example, when determination is made that the vehicle 12 is stopped at traffic lights based on information acquired from the external sensor 88B.

For example, the deployment amount L1 in the traveling state and the deployment amount L2 in the temporarily stopped state may be set to values within a predetermined range (outside the range Z) set in a country or region where the vehicle 12 is located as described above, and the deployment amount L3 in the stopped state may be set to a value exceeding the predetermined range (inside the range Z). The deployment amount L of the display screen 42 may be set to L3 also when the driving mode of the vehicle 12 is the autonomous driving mode.

The deployment amount L of the first display unit 38 may be set to any value within a predetermined range set in a country or region where the vehicle 12 is located by operating an operation unit (not shown) by the driver.

The display control unit 110 has a function of displaying various types of information on the first display unit 38. In this case, the display control unit 110 displays various types of information to fit with the deployment amount L of the display screen 42 of the first display unit 38. In other words, the display control unit 110 displays various types of information to fit in the area of the display screen 42 exposed to the vehicle cabin 14.

For example, the display control unit 110 causes the display screen 42 to display a rear seat image 200 captured by the second camera 96 for the rear seat. Thus, the occupant P1 in the driver's seat 30 can check the state of the rear seat 31 by viewing the first display unit 38 while hardly moving the line of sight during the driving.

The display control unit 110 identifies the camera that has captured the image of the occupant P2 from among the second cameras 96 based on the position of the occupant P2 in the rear seat 31 detected by the occupant position detection unit 106, and causes the display screen 42 to display the rear seat image 200 captured by the identified second camera 96. Thus, the first display unit 38 can reliably display the state of the occupant P2.

The display control unit 110 displays the rear seat image 200 in an area of the display screen 42 that is associated with the position of the occupant P2 in the vehicle cabin 14. That is, when the occupant P2 sits on the rear seat 31 provided on the right side in the vehicle width direction in the vehicle cabin 14, the rear seat image 200 showing the occupant P2 is displayed in a right area of the display screen 42.

Figure 7:
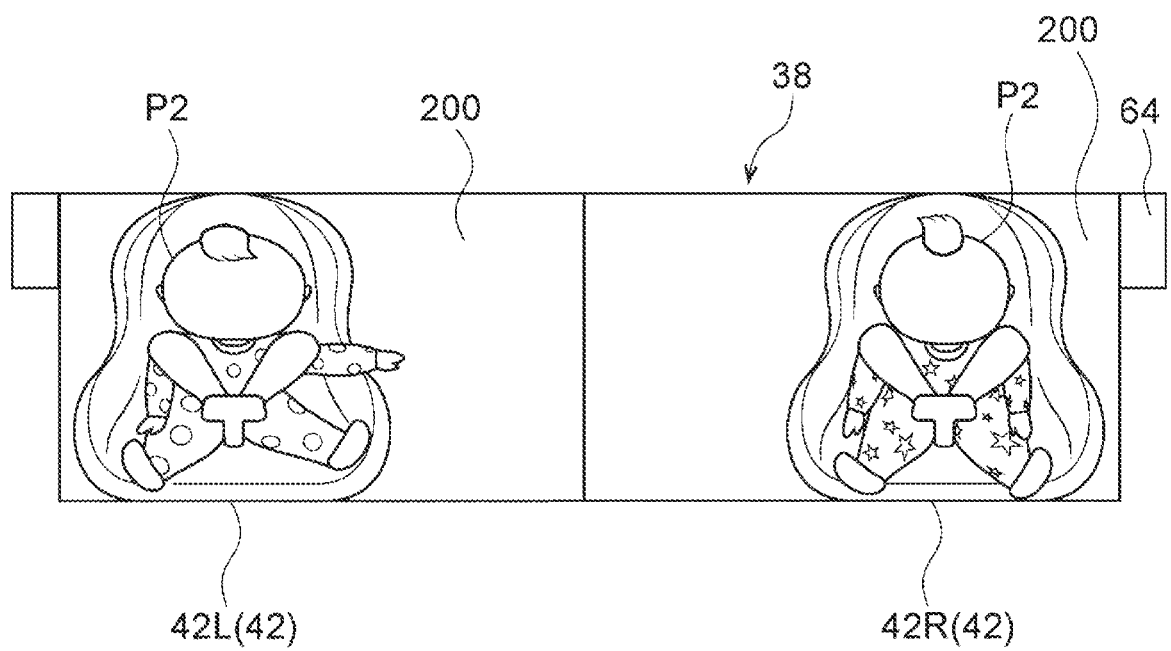
FIG. 7 is a diagram showing an example of a method for displaying rear-view images on the first display unit.

FIG. 7 shows an example of rear seat images 200 displayed on the display screen 42 deployed from the roof trim 24. As shown in FIG. 7, a rear seat image 200 showing an occupant P2 in the rear seat 31 provided on the right side in the vehicle cabin 14 is displayed in a right area 42R of the display screen 42. A rear seat image 200 showing an occupant P2 in the rear seat 31 provided on the left side in the vehicle cabin 14 is displayed in a left area 42L of the display screen 42. By displaying the images in this manner, the occupant P1 in the driver's seat can check the states of the rear seats by intuitively grasping positional relationships with the occupants P2 in the rear seats in the space inside the vehicle cabin 14 from the display screen 42.

The display control unit 110 displays the rear seat image 200 when predetermined biometric information is acquired from the biometric information of the occupant P2. The predetermined biometric information is, for example, biometric information having a value exceeding a threshold preset based on the type of the biometric information. For example, in a case where the biometric information is voice of the occupant P2, the rear seat image 200 is displayed when the occupant P2 speaks at a volume exceeding a predetermined threshold. In a case where the biometric information is motion of the occupant P2, the rear seat image 200 is displayed when a motion amount exceeding a predetermined threshold is detected for the occupant P2. Alternatively, the predetermined biometric information may be a call from the occupant P2, a specific gesture, a specific facial expression of the occupant P2, or the like.

In the present embodiment, the display mode of the first display unit 38 can be set from among an illumination mode, a standard information display mode, and a mirror mode by operating an operation unit (not shown) by the occupant P1. When the display mode is set, support information 300 set based on the display mode is displayed on the first display unit 38.

The display control unit 110 causes the first display unit 38 to display the support information 300 in each display mode side by side with the rear seat images 200. At this time, the display screen 42 displays the support information 300 while keeping the display areas (42R, 42L) for the rear seat images 200 displayed in association with the sitting positions of the occupants P2. For example, when the occupants P2 sit on both the right rear seat 31 and the left rear seat 31 in the vehicle width direction, the support information is displayed between the right area 42R and the left area 42L of the display screen 42.

Figure 8:
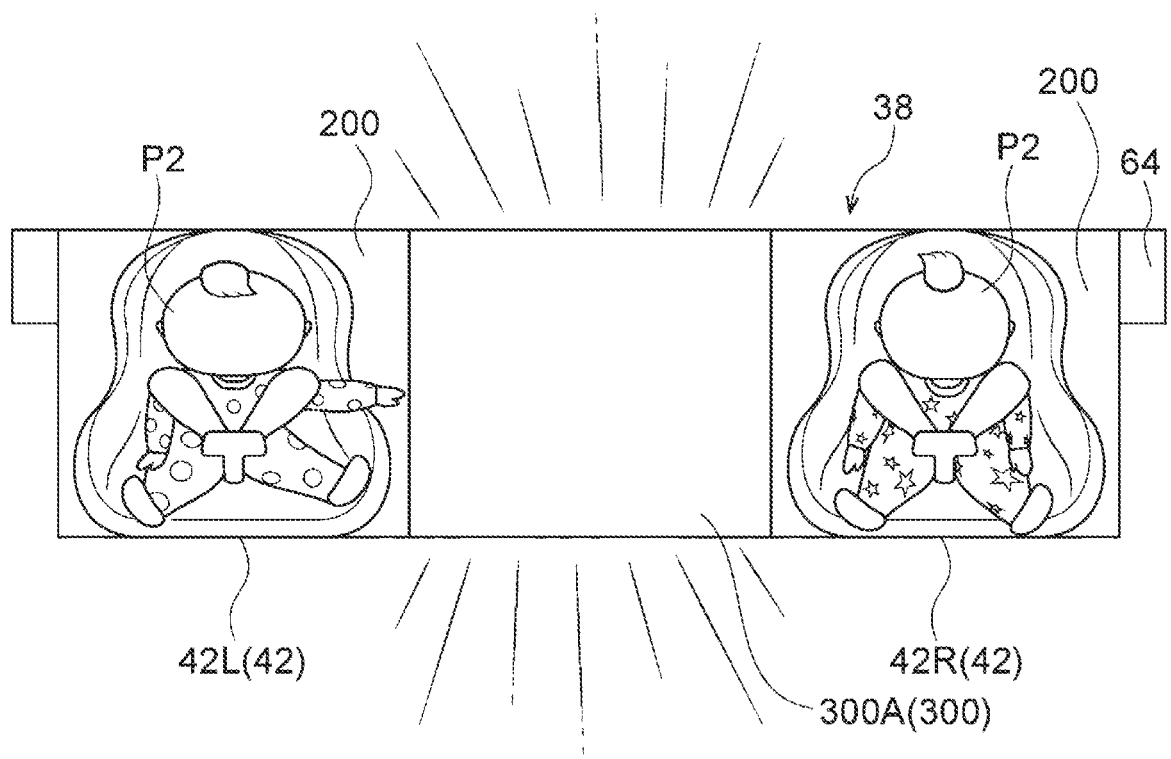
FIG. 8 is a diagram showing an example of a method for displaying the rear-view images and support information on the first display unit.

FIG. 8 shows a display example in a case where the display mode is set to the illumination mode. As shown in FIG. 8, the illumination mode is a mode in which the first display unit 38 functions as illumination by causing a part of the display screen 42 to emit light at a luminous intensity set by the occupant P1. The display screen 42 displays support information 300A as illumination light in a display area between the right area 42R and the left area 42L.

Figure 9:
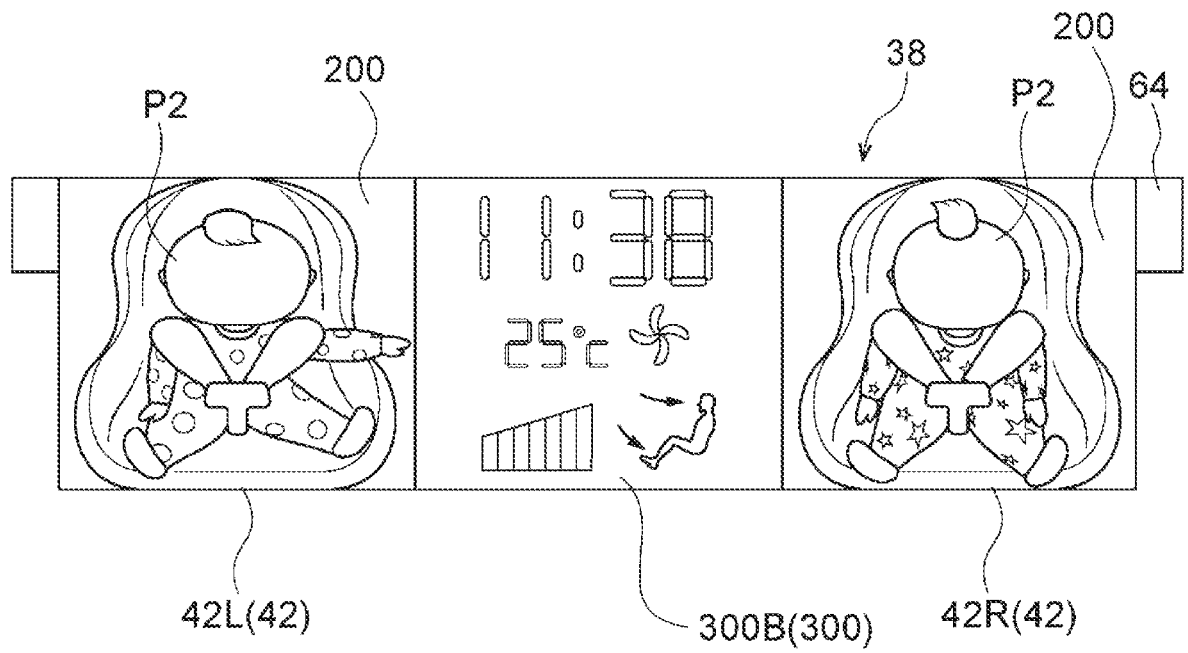
FIG. 9 is a diagram showing an example of the method for displaying the rear-view images and the support information on the first display unit.

FIG. 9 shows a display example in a case where the display mode is set to the standard information display mode. As shown in FIG. 9, the first display unit 38 in the standard information display mode displays time information and setting information of various in-vehicle devices. For example, the display screen 42 displays support information 300B about a current time and setting information of an air conditioner in the display area between the right area 42R and the left area 42L. The standard information display mode can be set as a default mode of the first display unit 38. If the standard information display mode is set as the default mode, the first display unit 38 is set to the standard information display mode when the ignition switch (not shown) is turned ON. When the ignition switch is turned OFF, the entire first display unit 38 is retracted into the inside of the roof trim 24.

Although illustration is omitted, a message such as "WELCOME" or "HAPPY BIRTHDAY" for the occupant P1 may be displayed as the support information in the standard information display mode. Information about door locking and window opening/closing detected by the vehicle status detection sensor 90 may be displayed.

Figure 10:
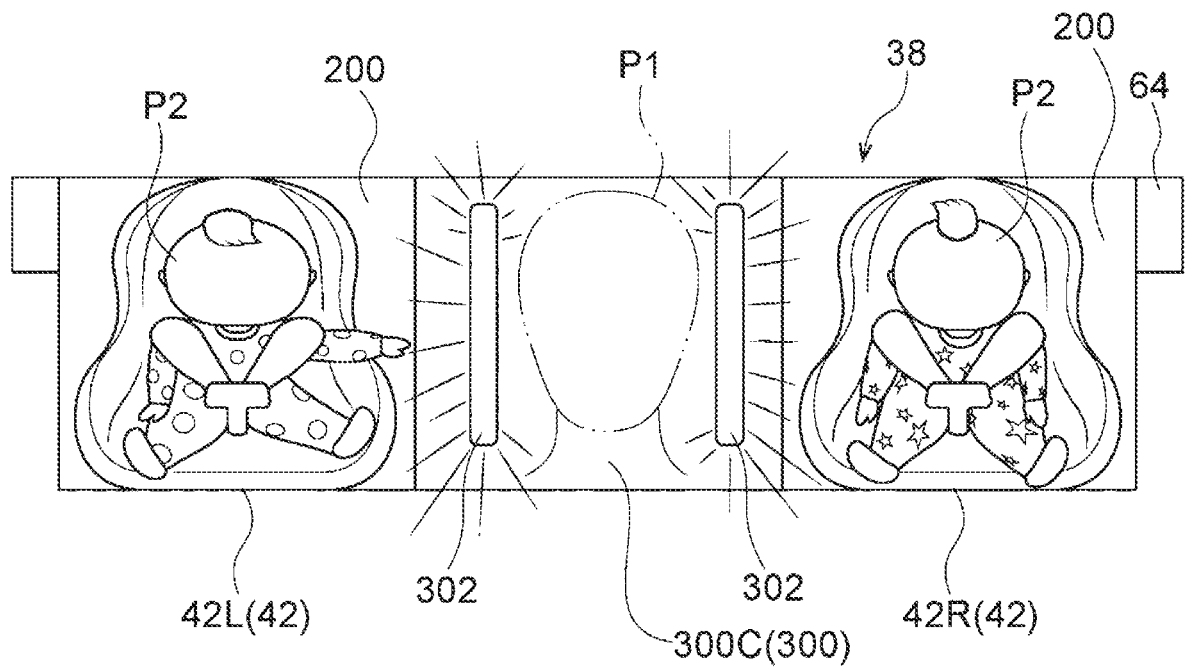
FIG. 10 is a diagram showing an example of the method for displaying the rear-view images and the support information on the first display unit.

FIG. 10 shows a display example in a case where the display mode is set to the mirror mode. As shown in FIG. 10, the mirror mode is a mode in which a part of the display screen 42 functions as a mirror. Specifically, in the mirror mode, a driver's seat image 300C captured by the first camera 94 for the driver's seat is acquired, and a mirror image of the occupant P1 is displayed on the display screen 42. In FIG. 10, the driver's seat image 300C showing the occupant P1 is displayed as the support information in the display area between the right area 42R and the left area 42L of the display screen 42.

Supplementally, in the mirror mode, right and left edges among the peripheral edges of the display area of the driver's seat image 300C are set to light emitters 302 to serve as illumination for the occupant P1.

Figure 11:
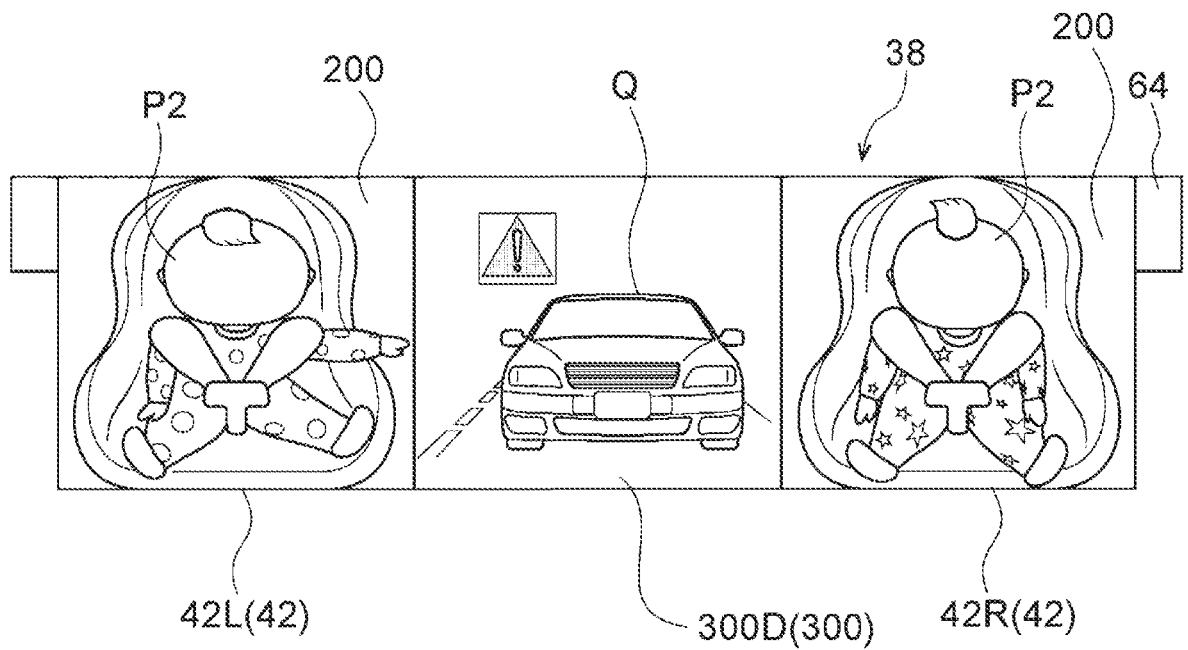
FIG. 11 is a diagram showing an example of the method for displaying the rear-view images and the support information on the first display unit.

The support information for supporting the occupant P1 in the driver's seat is not limited to the information described above, and may be support information about the driving of the vehicle 12 or warning information for avoiding danger. For example, as shown in FIG. 11, when the external sensor 88B including a camera or the like for capturing an image of a view behind the vehicle 12 has detected sudden approach of a rear vehicle, a rear-view image 300D showing a rear vehicle Q may be displayed as the support information to warn the occupant P1.

Although illustration is omitted, the display control unit 110 can cause the first display unit 38 to display the rear seat image 200 showing the occupant P2 and simultaneously cause the second display unit 98 disposed in front of the rear seat 31 to display the driver's seat image 300C showing the occupant P1 in the driver's seat 30. Accordingly, the occupant P1 and the occupant P2 can check the states of each other by viewing the first display unit 38 and the second display unit 98.

Operations

Figure 12:
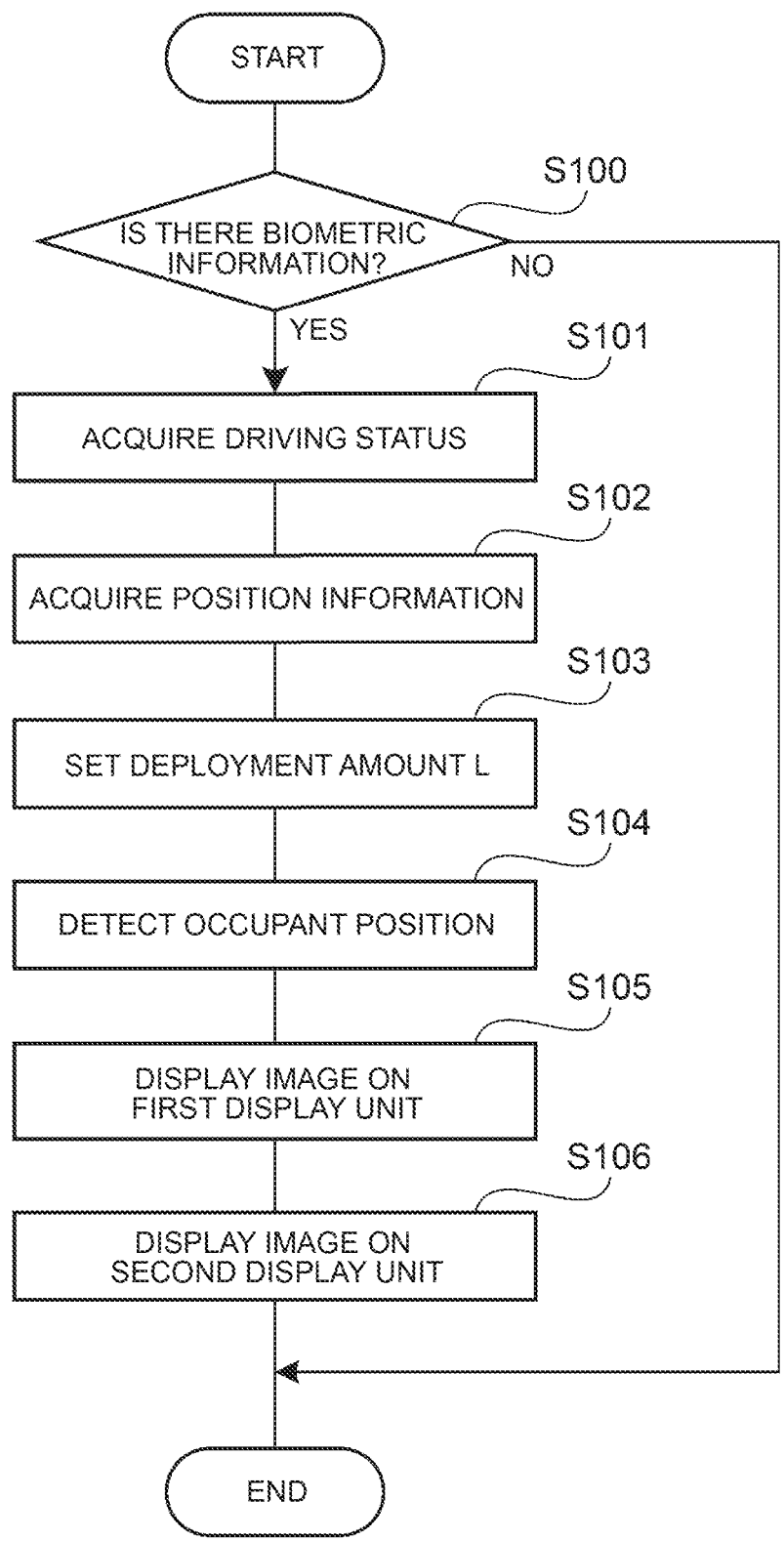
FIG. 12 is a flowchart showing an example of a flow of a display process according to the embodiment.

Next, operations of the present embodiment will be described. FIG. 12 is a flowchart showing an example of a display process to be executed by the control unit 40 at predetermined time intervals. The display process is executed by the CPU 74 reading a program from the ROM 76 or the storage 80 and loading the program in the RAM 78.

Display Process

In Step S100 of FIG. 12, the CPU 74 acquires biometric information of the occupant P2 in the rear seat 31 based on the function of the biometric information acquisition unit 104, and determines whether predetermined biometric information is included in the acquired biometric information.

When the CPU 74 determines that the predetermined biometric information is included, the process proceeds to Step S101. When the CPU 74 determines that the predetermined biometric information is not included, the process is terminated.

In Step S101, the CPU 74 acquires driving information of the vehicle 12 based on the function of the driving status acquisition unit 100.

In Step S102, the CPU 74 acquires position information of the vehicle 12 based on the function of the position information acquisition unit 102.

In Step S103, the CPU 74 sets the deployment amount L of the display screen 42 of the first display unit 38 based on the function of the drive control unit 108. For example, when the driving status of the vehicle 12 is the traveling state, the deployment amount L of the display screen 42 is set by referring to the position information of the vehicle and the deployment amount management table 80A within a range in which the display screen 42 does not obstruct the field of view of the occupant P1. When the first display unit 38 is retracted, the display screen 42 of the first display unit 38 is deployed in the vehicle cabin 14 based on the function of the drive control unit 108.

In Step S104, the CPU 74 acquires the position of the occupant P2 in the rear seat 31 based on the function of the occupant position detection unit 106.

In Step S105, the CPU 74 causes the first display unit 38 to display the rear seat image 200 showing the occupant P2 based on the function of the display control unit 110. At this time, the rear seat image 200 is displayed in the display area of the display screen 42 that is associated with the position of the occupant P2 in the vehicle cabin 14 as shown in FIG. 7. When the display mode of the first display unit 38 is set, the CPU 74 displays the support information 300 side by side with the rear seat image 200 as shown in FIGS. 8 to 11.

In Step S106, the CPU 74 causes the second display unit 98 disposed in front of the rear seat 31 to display the driver's seat image 300C showing the occupant P1 in the driver's seat 30. Then, the CPU 74 terminates the display process.

As described above, the vehicle display device 10 according to the present embodiment includes the first display unit 38 disposed in front of and above the driver's seat 30 and including the display screen 42 that is configured to be deployed from the roof trim 24 in the vehicle cabin 14 into the vehicle cabin 14 and be withdrawn from the vehicle cabin 14 into an inside of the roof trim 24. The first display unit 38 can change the deployment amount L into the vehicle cabin 14 by causing the drive unit 44 to drive the display screen 42. The vehicle display device 10 includes the control unit 40 that controls the first display unit 38 and the drive unit 44. The control unit 40 includes the driving status acquisition unit 100, the drive control unit 108, and the display control unit 110. The drive control unit 108 changes the deployment amount L of the display screen 42 into the vehicle cabin 14 under control of the drive unit 44 based on the driving status acquired by the driving status acquisition unit 100. The display control unit 110 causes the display screen 42 to display the rear seat image 200 captured by the second camera 96 for the rear seat to fit with the deployment amount L of the display screen 42.

Thus, the occupant P1 in the driver's seat 30 can check the state of the rear seat 31 by slightly moving the line of sight to view the first display unit 38. During the traveling, the deployment amount L of the display screen 42 can be adjusted so as not to obstruct the field of view of the occupant P1 who is the driver, thereby reducing the occurrence of a case where the occupant P1 feels annoyed while driving the vehicle. Accordingly, the vehicle display device 10 can reduce the burden on the occupant P1 driving in the driver's seat 30 when checking the state of the rear seat 31.

In the present embodiment, the deployment amount L of the display screen 42 during the traveling is changed within the predetermined range set in a country or region where the vehicle 12 is located based on the position information of the vehicle 12 acquired by the position information acquisition unit 102. Therefore, the deployment position of the first display unit 38 can be set in compliance with the laws and regulations of the country or region where the vehicle 12 is located.

In the present embodiment, the timing to display the rear seat image 200 on the display screen 42 is a timing when the biometric information acquisition unit 104 has acquired the predetermined biometric information about the occupant P2 in the rear seat 31. Therefore, it is possible to prompt the occupant P1 in the driver's seat 30 to check the first display unit 38 at an appropriate timing in response to the change in the occupant P2 in the rear seat 31.

According to the present embodiment, it is possible to prompt the occupant P1 in the driver's seat 30 to actively check the first display unit 38 in response to the change in the occupant P2 in the rear seat 31 even when the first display unit 38 is retracted in the inside of the roof trim 24.

In the present embodiment, the rear seat image 200 is displayed in the area of the display screen 42 that is associated with the position of the occupant P2 in the rear seat 31 in the vehicle cabin 14. By viewing the first display unit 38, the occupant P1 in the driver's seat 30 can check the state of the rear seat 31 by intuitively grasping the position of the occupant P2 in the rear seat 31 in the space inside the vehicle cabin 14 from the display screen 42.

To display the support information 300 on the display screen 42, the support information 300 is displayed side by side with the rear seat image 200 while keeping the area where the rear seat image 200 is displayed. As a result, when both the rear seat image 200 and the support information 300 are displayed, blinking of the display screen 42 can be reduced, thereby reducing the annoyance felt by the occupant P1 in the driver's seat 30.

In the present embodiment, when the rear seat image 200 is displayed on the first display unit 38, the driver's seat image 300C captured by the first camera 94 for the driver's seat is displayed on the second display unit 98 for the rear seat. As a result, the occupant P1 in the driver's seat 30 and the occupant P2 in the rear seat 31 can check the states of each other, thereby facilitating communication.

In the present embodiment, based on the function of the display control unit 110, the second camera 96 that has captured the image of the occupant P2 in the rear seat 31 is identified from among the second cameras 96 for the rear seats, and the image captured by the identified second camera is displayed on the first display unit 38. Therefore, the first display unit 38 can reliably display the image of the occupant P2 in the rear seat 31 even when the plurality of second cameras 96 for the rear seats is installed because of the plurality of rear seats 31 in the vehicle cabin 14.

In the present embodiment, the first display unit 38 includes the organic electroluminescence element and has the film shape. When retracting the first display unit 38, the first display unit 38 can be bent. Therefore, the arrangement space for the first display unit can be saved.

Supplementary Description

In the embodiment described above, the function of identifying the second camera 96 that has captured the image of the occupant P2 in the rear seat from among the second cameras 96 for the rear seats and causing the first display unit 38 to display the image captured by the identified second camera 96 has been described as the function of the display control unit 110. However, the present disclosure is not limited to this case.

First Modification of Display Control Unit 110

Figure 13:
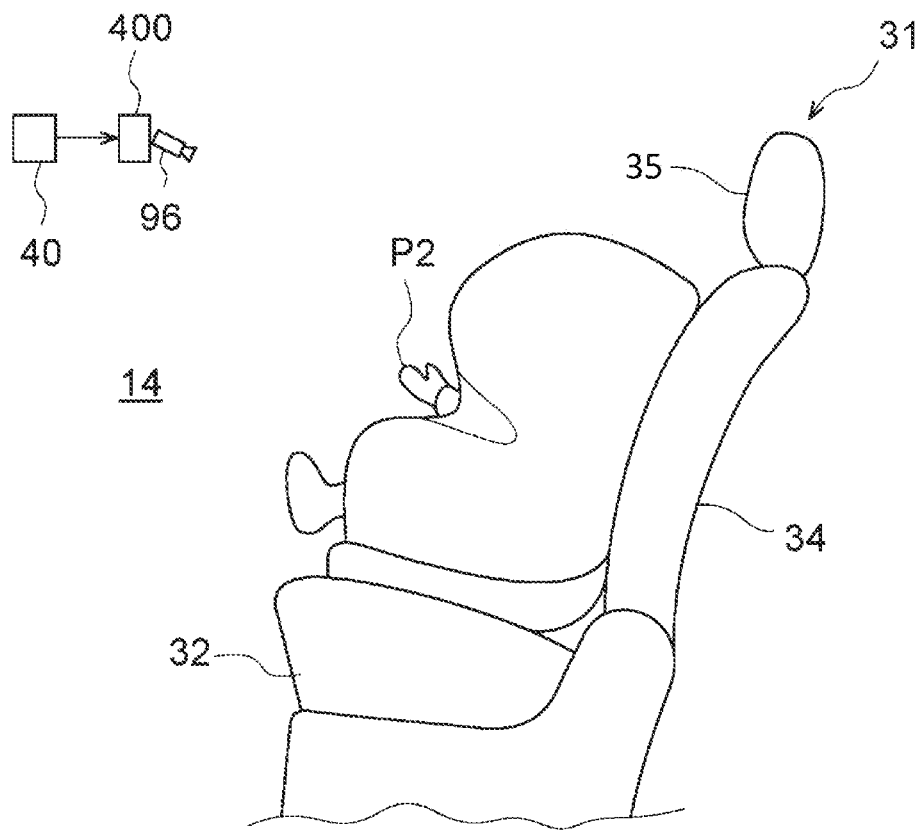
FIG. 13 is a schematic diagram of a rear seat shown for describing a modification of a display control unit.

For example, as shown in FIG. 13, the display control unit 110 may be configured to control drive of an actuator 400 connected to the second camera 96. By controlling the drive of the actuator 400, the display control unit 110 may change the image capturing range of the second camera 96 to include the position of the occupant P2 detected by the occupant position detection unit 106. Then, the image captured by the second camera 96 is displayed on the display screen 42 of the first display unit 38. As a result, even when the plurality of rear seats 31 is provided in the vehicle cabin 14, the single second camera 96 can capture the images of the rear seats 31 by controlling the actuator 400. Thus, the number of second cameras 96 to be installed can be reduced.

Second Modification of Display Control Unit 110

Figure 14:
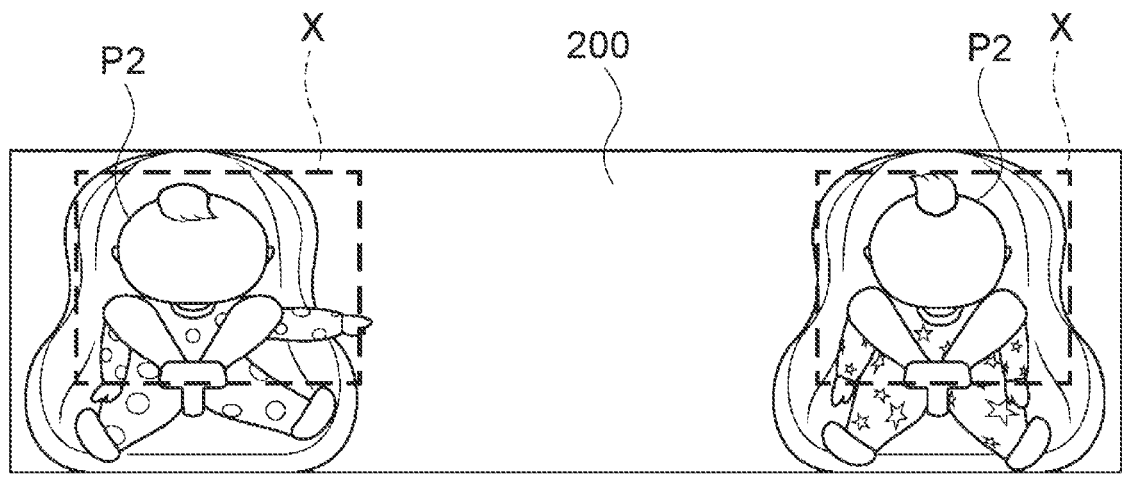
FIG. 14 shows an example of a rear seat image shown for describing a modification of the display control unit.

Alternatively, as shown in FIG. 14, the display control unit 110 may cause the second camera 96 for the rear seats to capture an image showing the rear seats 31, extract areas X corresponding to the positions of the occupants P2 detected by the occupant position detection unit 106 from the rear seat image 200 captured by the second camera 96, and cause the display screen 42 to display the images in the areas X. As a result, even when the plurality of rear seats 31 is provided in the vehicle cabin 14, the second camera 96 for the rear seats captures the image showing the rear seats and a part of the captured image is extracted. Thus, the number of second cameras 96 to be installed can be reduced.

In the embodiment described above, a device including a rack-and-pinion mechanism or a ball screw mechanism is employed as the drive unit for moving the first display unit into the inside of the interior member or deploying the first display unit from the interior member. The mechanism employable as the drive unit is not limited to this device. For example, a device including a pantograph mechanism may be employed as the drive unit depending on the specifications of the vehicle 12.

In the embodiment described above, the organic electroluminescence display is employed as the first display unit, but the first display unit is not limited to this type of display. For example, a small-sized liquid crystal display may be employed as the first display unit depending on the specifications of the vehicle 12.

In the present embodiment, the vehicle including one row of rear seats behind the driver's seat has been described as an example in the drawings. The number of rear seats is not limited to this case, and may be changed as appropriate depending on the specifications of the vehicle. Two or more rows of rear seats may be provided, and the vehicle display device according to the embodiment and the modifications described above may be mounted in a vehicle cabin of a large-sized vehicle such as a kindergarten bus.

In the embodiment described above, the vehicle seat installed in advance in the vehicle cabin 14 has been described as an example of the rear seat 31, but the definition of the rear seat in the present disclosure is not limited to the vehicle seat, and is a broad concept that includes a space where an occupant in a wheelchair fixes the wheelchair, the space being in the vehicle cabin.

Various processors other than the CPU may execute the display process executed by the CPU reading the software (program) in the embodiment described above. Examples of the processor in this case include a programmable logic device (PLD) whose circuit configuration can be changed after manufacture, such as field-programmable gate array (FPGA), and a dedicated electric circuit that is a processor having a circuit configuration designed exclusively to perform a specific process, such as application-specific integrated circuit (ASIC). The display process may be performed by one of the various processors, or may be performed by a combination of two or more processors of the same type or different types (for example, a plurality of FPGAs or a combination of a CPU and an FPGA). The hardware configuration of the various processors is more specifically an electric circuit in which circuit elements such as semiconductor devices are combined.

In the embodiment described above, description has been given of the case where the program of the display process is prestored (preinstalled) in the ROM or the storage, but the present disclosure is not limited to this case. The program may be provided by being recorded on a recording medium such as a compact disk read-only memory (CD-ROM), a digital versatile disk read-only memory (DVD-ROM), or a universal serial bus (USB) memory. The program may be downloaded from an external device via a network.

What is claimed is:

1. A vehicle display device, comprising:
    a first display unit disposed in front of and above a driver's seat of a vehicle and including a display screen configured to be deployed from an interior member in a vehicle cabin of the vehicle into the vehicle cabin and be withdrawn from the vehicle cabin into an inside of the interior member;
    a motor configured to drive the display screen of the first display unit; and
    a processor configured to control the first display unit and the drive unit motor, wherein
    the processor is configured to:
        acquire a driving status of the vehicle,
        change a deployment amount of the display screen into the vehicle cabin under control of the motor based on the acquired driving status, and
        cause the display screen to display a rear seat image captured by an in-vehicle camera for a rear seat to fit with the deployment amount of the display screen, and
    the processor is further configured to
        acquire biometric information of an occupant in the rear seat in the vehicle cabin, and
        in response to acquiring predetermined biometric information,
            before the deployment amount of the display screen into the vehicle cabin is changed based on the acquired driving status, deploy the display screen by the deployment amount based on the driving status of the vehicle from a retracted state in which the first display unit is retracted inside the interior member, and
            after the display screen is deployed, cause the display screen to display the rear seat image.

2. The vehicle display device according to claim 1, wherein:
    the processor is further configured to
        acquire position information of the vehicle; and
        change, based on the acquired position information of the vehicle, the deployment amount of the display screen within a predetermined range set in a country or a region where the vehicle is located.

3. The vehicle display device according to claim 1, wherein
the processor is further configured to set a first deployment amount of the display screen into the vehicle cabin when the acquired driving status is a traveling state to be smaller than (i) a second deployment amount of the display screen into the vehicle cabin when the acquired driving status is a temporarily stopped state or (ii) a third deployment amount of the display screen into the vehicle cabin when the acquired driving status is a stopped state.

4. The vehicle display device according to claim 3, wherein
the processor is further configured to set the second deployment amount of the display screen into the vehicle cabin when the acquired driving status is the temporarily stopped state to be smaller than the third deployment amount of the display screen into the vehicle cabin when the acquired driving status is the stopped state.

5. The vehicle display device according to claim 1, wherein
the predetermined biometric information is biometric information having a value exceeding a predetermined threshold set based on a type of the biometric information.

6. The vehicle display device according to claim 5, wherein:
(i) the biometric information is a voice of the occupant in the rear seat, and
the predetermined biometric information is the voice of the occupant in the rear seat with a volume exceeding the predetermined threshold; or
(ii) the biometric information is a motion of the occupant in the rear seat, and
the predetermined biometric information is the motion of the occupant in the rear seat with a motion amount exceeding the predetermined threshold.

7. The vehicle display device according to claim 1, wherein
the processor is further configured to display the rear seat image in an area of the display screen, the area of the display screen being associated with a position of the occupant in the rear seat in the vehicle cabin.

8. The vehicle display device according to claim 7, wherein
the processor is further configured to display support information, that supports an occupant in the driver's seat, side by side with the rear seat image while keeping the area of the display screen where the rear seat image is displayed.

9. The vehicle display device according to claim 1, further comprising:
a second display unit disposed in front of the rear seat, wherein
the processor is further configured to, in response to causing the first display unit to display the rear seat image, cause the second display unit to display a driver's seat image captured by a further in-vehicle camera for the driver's seat.

10. The vehicle display device according to claim 1, wherein
the processor is further configured to
detect a position of the occupant in the rear seat in the vehicle cabin,
identify a further in-vehicle camera that has captured an image of the occupant in the rear seat from among a plurality of in-vehicle cameras for the rear seat based on the detected position of the occupant, and
cause the display screen to display the image captured by the identified further in-vehicle camera.

11. The vehicle display device according to claim 1, wherein
the processor is further configured to
detect a position of the occupant in the rear seat in the vehicle cabin,
control drive of an actuator connected to the in-vehicle camera for the rear seat,
change an image capturing range of the in-vehicle camera by controlling the drive of the actuator to include the detected position of the occupant, and
cause the display screen to display the rear seat image captured by the in-vehicle camera for the rear seat.

12. The vehicle display device according to claim 1, wherein
the processor is further configured to
detect a position of the occupant in the rear seat in the vehicle cabin,
extract an image showing an area that is based on the detected position of the occupant from the rear seat image captured by the in-vehicle camera for the rear seat, and
cause the display screen to display the extracted image.

13. The vehicle display device according to claim 1, wherein
the first display unit includes an organic electroluminescence element and has a film shape.

14. A vehicle, comprising:
a vehicle cabin including a driver's seat and a rear seat;
a vehicle display device including
a first display unit disposed in front of and above the driver's seat and including a display screen configured to be deployed from an interior member in the vehicle cabin into the vehicle cabin and be withdrawn from the vehicle cabin into an inside of the interior member,
a motor configured to drive the display screen of the first display unit, and
a processor configured to control the first display unit and the motor; and
an in-vehicle camera for the rear seat, wherein
the processor of the vehicle display device is configured to
acquire a driving status of the vehicle,
change a deployment amount of the display screen into the vehicle cabin under control of the motor based on the acquired driving status, and
cause the display screen to display a rear seat image captured by the in-vehicle camera for the rear seat to fit with the deployment amount of the display screen, and
the processor is further configured to
acquire biometric information of an occupant in the rear seat in the vehicle cabin, and
in response to acquiring predetermined biometric information,
before the deployment amount of the display screen into the vehicle cabin is changed based on the acquired driving status, deploy the display screen by the deployment amount based on the driving status of the vehicle from a retracted state in which the first display unit is retracted inside the interior member, and after the display screen is deployed, cause the display screen to display the rear seat image.

15. The vehicle according to claim 14, further comprising:
a further in-vehicle camera for the driver's seat, wherein:
the vehicle display device includes a second display unit disposed in front of the rear seat; and
the processor is further configured to, in response to causing the first display unit to display the rear seat image, cause the second display unit to display a driver's seat image captured by the further in-vehicle camera for the driver's seat.

16. The vehicle display device according to claim 1, wherein
the processor is further configured to, in response to acquiring the predetermined biometric information, acquire the driving status of the vehicle.

17. The vehicle display device according to claim 1, wherein
the processor is further configured to determine the deployment amount to deploy the display screen of the first display unit within a range in which the display screen does not enter a range of a driver's effective field of view.

18. The vehicle display device according to claim 1, wherein
the processor is configured to cause a part of the display screen to emit light at a luminous intensity, set by a driver, in an illumination mode.

19. The vehicle according to claim 14, wherein
the processor is further configured to, in response to acquiring the predetermined biometric information, acquire the driving status of the vehicle.

20. The vehicle according to claim 14, wherein
the processor is further configured to determine the deployment amount to deploy the display screen of the first display unit within a range in which the display screen does not enter a range of a driver's effective field of view.

* * * * *